United States Patent
Kallesøe et al.

(10) Patent No.: US 11,454,009 B2
(45) Date of Patent: Sep. 27, 2022

(54) CONTROL SYSTEM AND METHOD FOR CONTROLLING A WATER SUPPLY FROM AT LEAST TWO SEPARATE INPUT LINES INTO A SECTOR OF A WATER SUPPLY NETWORK

(71) Applicant: GRUNDFOS HOLDING A/S, Bjerringbro (DK)

(72) Inventors: Carsten Skovmose Kallesøe, Viborg (DK); Abdul-Sattar Hassan, Egå (DK); Tom Nørgaard Jensen, Gistrup (DK)

(73) Assignee: GRUNDFOS HOLDING A/S, Bjerringbro (DK)

( * ) Notice: Subject to any disclaimer, the term of this patent is extended or adjusted under 35 U.S.C. 154(b) by 550 days.

(21) Appl. No.: 16/447,154

(22) Filed: Jun. 20, 2019

(65) Prior Publication Data
US 2019/0390445 A1    Dec. 26, 2019

(30) Foreign Application Priority Data

Jun. 21, 2018  (EP) .................................... 18179030

(51) Int. Cl.
*E03B 7/07*         (2006.01)
*E03B 1/02*         (2006.01)
(Continued)

(52) U.S. Cl.
CPC ................ *E03B 7/075* (2013.01); *E03B 1/02* (2013.01); *E03B 7/09* (2013.01); *G05D 16/2066* (2013.01); *E03B 11/10* (2013.01)

(58) Field of Classification Search
CPC ... E03B 7/075; E03B 7/09; E03B 1/02; E03B 11/10; G05D 16/2066
(Continued)

(56) References Cited

U.S. PATENT DOCUMENTS

2010/0168927 A1*  7/2010  Burrows ............ G05D 16/2095
                                                                700/282
2018/0100509 A1   4/2018  Kallesøe et al.

FOREIGN PATENT DOCUMENTS

CN           103266646 A       8/2013
CN           104929191 A       9/2015
(Continued)

*Primary Examiner* — Michael P Nghiem
*Assistant Examiner* — Dacthang P Ngo
(74) *Attorney, Agent, or Firm* — McGlew and Tuttle, P.C.

(57) ABSTRACT

A control system (15) controls a water supply from at least two separate input lines (3i-k) into a sector (1) of a water supply network. The control system (15) is configured to receive input flow information indicative of the water input flow ($q_{i-k}$) through each of the input lines (3i-k). The control system (15) is configured to receive input pressure information indicative of the input pressure ($p_i$) in at least one (3i) of the input lines (3i-k). The control system (15) is configured to receive pressure information indicative of at least one pressure value ($p_{cri,m,n}$) determined by a pressure sensor (7m,n) within the sector (1). The control system (15) is configured to control the input pressure ($p_i$) by controlling at least a pressure regulating system (13i) at an input line (3i) based on the input flow information from all input lines (3i-k) and based on the sector pressure information.

25 Claims, 10 Drawing Sheets

(51) Int. Cl.
  *G05D 16/20* (2006.01)
  *E03B 11/10* (2006.01)
  *E03B 7/09* (2006.01)
(58) Field of Classification Search
  USPC ........................................................ 702/282
  See application file for complete search history.

(56) References Cited

FOREIGN PATENT DOCUMENTS

WO  2008090359 A2  7/2008
WO  2010076558 A2  7/2010

* cited by examiner

CONTROL SYSTEM AND METHOD FOR CONTROLLING A WATER SUPPLY FROM AT LEAST TWO SEPARATE INPUT LINES INTO A SECTOR OF A WATER SUPPLY NETWORK

CROSS REFERENCE TO RELATED APPLICATIONS

This application claims the benefit of priority under 35 U.S.C. § 119 of European Application 18179030.4, filed Jun. 21, 2018, the entire contents of which are incorporated herein by reference.

TECHNICAL FIELD

The present disclosure is directed to a control system and method for controlling a water supply from at least two separate input lines into a sector of a water supply network, and a water supply system controlled thereby. Water supply networks may, for instance, be installed in a large building or an agglomeration of buildings, like a city, a village, a town, an industrial area, a neighbourhood or a quarter. A sector of a water supply network may be referred to as a District Metering Area (DMA) or a Pressure Management Area (PMA).

BACKGROUND

Typically, water supply companies provide water to households and industry by means of a water supply network that is sectored in DMAs or PMAs. Usually, each DMA or PMA is supplied with water by at least one water supply source, e.g. a pumping station. However, in order to provide redundancy for uninterrupted service and/or a desired water mix from more than one water supply source, DMAs or PMAs are often supplied with water by at least two or more water supply sources, e.g. several pumping stations. Assuming that no water tower is used as an elevated water supply source, it is a challenge to ensure that a desired pressure is available at all extraction points, e.g. tap connections, within a DMA or PMA at any time and any flow demand, and that a desired mix of flow from the different water supply sources is obtained.

It is known to define a fixed pressure profile for one of the water supply sources in order to meet an expected demand during the day and during the night. The fixed pressure profile may, for instance, be a constant day pressure and a constant night pressure. The fixed pressure profile is typically chosen higher than a required minimum in a conservative fashion to ensure that always more than a minimum pressure is available at all extraction points within a DMA or PMA. The other water supply sources may simply contribute a fixed share of flow.

That known solution has the disadvantage that the pressure is always higher than it actually has to be, which causes more water loss by leakage and consumes more pumping energy than necessary.

SUMMARY

In contrast to known systems, embodiments of the present disclosure provide a control system and method for controlling a water supply from at least two separate input lines into a sector of a water supply network, ensuring that a desired pressure is available at all extraction points within a DMA or PMA at any time and any flow demand with less leakage and less energy consumption, while establishing a desired mix of flow from the different input lines.

In accordance with a first aspect of the present disclosure, a control system is provided for controlling a water supply from at least two separate input lines into a sector of a water supply network, wherein the control system is configured to receive continuously, regularly or sporadically input flow information indicative of the water input flow through each of the input lines, wherein the control system is configured to receive continuously, regularly or sporadically input pressure information indicative of the input pressure in at least a first one of the input lines, wherein the control system is configured to receive continuously, regularly or sporadically sector pressure information indicative of at least one pressure value determined by at least one pressure sensor within the sector of the water supply network, wherein the control system is configured to control the input pressure by controlling at least a first pressure regulating system at the first input line based on the input flow information from all input lines and based on the sector pressure information.

The at least one pressure regulating system may, for instance, be a pumping station with one or more pumps and/or a valve station with one or more pressure reduction valves (PRV). Preferably, the at least one pressure sensor within the sector may be positioned where the lowest pressure is expected within the sector, i.e. at one or more critical points of highest elevation and/or furthest distance to the input lines. The at least one pressure sensor may thus be referred to as critical pressure sensor(s), because the pressure elsewhere within the sector may always be equal to or higher than the critical pressure measured by the critical pressure sensor. The communication of pressure and/or flow information may be wireless, by wire and/or by glass fibre connection. The flow information of the input lines may be based on flow meter measurements and/or, in case of a pressure regulating system with one or more pump(s), based on flow indicators such as consumed power or current drawn by the pump(s). With regard to the first input line, the control system processes the flow information from all input lines and the sector pressure information in order to establish a certain input pressure at the first input line. With regard to the other input lines, the control system may process the flow information from all input lines and the sector pressure information either in order to establish a certain input flow at each other input line or in order to establish a certain input pressure at each other input line.

Optionally, the control system may be configured to decrease gradually and/or in steps the input pressure until the lowest of the at least one pressure value determined by the at least one pressure sensor within the sector has dropped to a required minimum sector pressure. The lowest critical pressure may thus be considered the most critical for ensuring that a required minimum sector pressure is available at all extraction points, e.g. tap connections, within the sector at any time and any flow demand. Instead of providing a fixed pressure profile that is typically chosen higher than a required minimum in a conservative fashion, the control system allows for a gradual and/or stepwise optimisation in terms of leakage and energy consumption, while establishing a desired mix of flow from the different input lines and providing sufficient sector pressure.

Optionally, the control system may be configured to control the contribution of the input flow through each of the input lines to the total input flow of all input lines according to an associated weight factor w for each of the input lines to obtain a desired mix of input flows. The term "weight factor" shall be understood as a dimensionless fraction that a certain input line contributes to the total input flow. The sum of all weight factors for all input lines thus equals 1. For instance, in case of a system with three input lines, wherein one input line shall contribute twice as much flow as the other two input lines, the weight factor $w_1$ of the first input line may be 0.5 and the weight factors $w_2$ and $w_3$ of the second and third input line, respectively, may be 0.25, wherein $w_1+w_2+w_3=0.5+0.25+0.25=1$. The weight factors may be pre-determined and/or programmable parameters.

Optionally, according to a first embodiment, the control system is configured to control the input pressure by controlling only the first pressure regulating system at the first input line based on the input flow information from all input lines and based on the sector pressure information. In this first embodiment, the control system treats the first input line differently from the other input lines, because the first input line is pressure-controlled, whereas the other input lines are flow-controlled according to a flow reference. It may be a selectable parameter of the control system which of the input lines is treated as the first input line, i.e. which is the pressure-controlled one. That input line which is designated to provide the highest flow may be the preferred choice for obtaining a robust control, but in principle any input line may serve as the first, pressure-controlled, input line. The first embodiment may thus be referred to as asymmetric. The term "asymmetric" shall not mean that the flow contributions from the input lines or the pressures at all input lines must differ, but it refers to the different control method the control system applies to the first pressure regulating systems compared to the other pressure regulating systems at the other input lines.

Optionally, according to a second embodiment, the control system may be configured to receive continuously, regularly or sporadically input pressure information indicative of the input pressure in each of the input lines, wherein the control system is configured to control the input pressure in each of the input lines by controlling a pressure regulating system in each input line based on the input flow information and the input pressure information from all input lines, and the sector pressure information. In this second embodiment, the control system may treat all input lines the same by pressure-controlling them all. The second embodiment may thus be referred to as symmetric. The term "symmetric" shall not mean that the flow contributions from the input lines or the pressures at all input lines are the same, but it refers to the same pressure-control method the control system applies to all pressure regulating systems in the different input lines.

Optionally, according to any embodiment, the control system may comprise a first input control module for controlling the first pressure regulating system, wherein the first input control module is configured to receive the input flow information from all input lines and a parameter set [A, B] for setting the input pressure at the first input line to $p_{set}=Aw^2Q^2+B$, wherein Q is the total input flow of all input lines and w is a weight factor for the flow contribution of the first input line to the total input flow of all input lines. The first input control module may be referred to as a "local input controller" at the first input line. The pressure-control method applied by the local input controller may be referred to a "curve-control", wherein the parameter set [A, B] defines the q,p-curve. It should be noted that the parameter set [A, B] may change over time and thus be denoted as [A(t), B(t)]. The first input control module may not be dependent on a stable signal connection to other control modules to be able to control the first pressure regulating system locally. The first input control module may, for instance, be located in, on, or at a pump assembly of the first pressure regulating system.

Optionally, according to the first embodiment, the control system may comprise for each of the other input lines an input control module i≠1 for controlling an associated pressure regulating system at each of the other input lines, wherein each of the input control modules i≠1 is configured to receive the input flow information from all input lines for setting the input flow at the i-th input line to $q_{set,i}=w_i^2Q^2$, wherein Q is the total input flow of all input lines and $w_i$ is a weight factor for the flow contribution of the i-th input line to the total input flow of all input lines. The other input lines that are not pressure-controlled like the first input line are thus flow-controlled by means of a "local input controller" at each of the other input lines. The local input control modules at the other input lines may be identical to the first input control module, but may have a different setting defined by the control system. For instance, the control system may be configured to be able to change the settings in such way that another input line may serve as the pressure-controlled input line. For instance, if another water mix is desired, another input line may be the input line designated to contribute the highest flow into the sector. That input line would then be the preferred choice to serve as the pressure-controlled first input line. The control system may comprise a switch functionality for switching the control mode of the local input control modules accordingly between pressure-control and flow-control. Each of the local input control modules may be configured to receive the sector pressure information in order to be able to serve as the first input line. The control system may comprise the local input control modules with or without an overarching sector control module. The local input control modules may simply exchange flow information directly with each other and/or via an overarching sector control module. An overarching sector control module may be implemented in a cloud, a network-connected remote computer system or integrated in one or more of the local input control modules. Most preferably, the first embodiment is used without an overarching sector control module, because only a minimal data exchange is needed for the direct exchange of flow information between the local input control modules.

Optionally, according to the second embodiment, the control system may comprise for each of the input lines an input control module i for controlling an associated pressure regulating system at each of the input lines, wherein each input control module i is configured to receive the input flow information from all input lines and a parameter set [$A_i$, $B_i$] for setting the input pressure at the i-th input line to $p_{set,i}=A_iw_i^2Q^2+B_i$, wherein Q is the total input flow of all input lines and $w_i$ is a weight factor for the flow contribution of the i-th input line to the total input flow of all input lines. It should be noted that the parameter set [$A_i$, $B_i$] may change over time and thus be denoted as [$A_i(t)$, $B_i(t)$]. All input lines are thus pressure-controlled like the first input line by means of a "local input controller" at each input line. The local input control modules may be identical to the first input control module and may have the same setting. In contrast to the first asymmetric first embodiment, the symmetric second embodiment allows for an optimisation of the individual curve-control of each input line, but requires slightly more data exchange.

Optionally, and most preferably in connection with the second embodiment, the control system may comprise a sector control module for receiving input flow information from each of the input lines and the sector pressure information, wherein the sector control module is further configured to accordingly update and provide a parameter set $[A_i, B_i]$ for the input pressure at the i-th of the input lines to be set to $p_{set,i}=A_i w_i^2 Q^2 + B_i$, wherein Q is the total input flow of all input lines and $w_i$ is a weight factor for the flow contribution of the i-th input line to the total input flow of all input lines. The sector control module may be referred to as "global", "overarching" or "sector-wide", because it may serve as a communication hub between the local input control modules and may perform a sector-wide optimisation by updating and providing the q,p-curve parameter set $[A_i, B_i]$ for each input line i. It should be noted that the parameter set $[A_i, B_i]$ may change over time and thus be denoted as $[A_i(t), B_i(t)]$. The overarching sector control module may receive the sector pressure information from the critical pressure sensor within the sector directly. There is no need to provide the sector pressure information to the local first control module as in the first embodiment if no overarching sector control module is used.

Optionally, the input flow information from each of the input lines may comprise input flows through each of the input lines and an expected trend in the total flow of all input lines, preferably in form of a Kalman filter state vector. The trend information allows for a certain prediction of the future flow so that the control system is not dependent on a continuous connectivity. If, for some reason, the control system has no signal connection for receiving current flow information from one or more input lines, the control system can "guess" the flow based on the trend information. Therefore, the control system is less susceptible to network instabilities. The trend information also provides the opportunity to save bandwidth by not continuously receiving flow information, but only regularly or sporadically. A Kalman filter state vector may provide a very efficient way to exchange a data set of the flow information including a linear trend information.

Optionally, the control system may be configured to control the input pressure by controlling at least a first pressure regulating system at the first input line based selectively on a short-term prediction or a long-term prediction of the input flow information from all input lines, wherein a criterion for selecting either the short-term prediction or the long-term prediction is the time period lapsed since the latest successful receiving of input flow information from all input lines. The short-term prediction may be the preferred selection that the control system usually uses to bridge a relatively short time period, e.g. several minutes, between data sets. The long-term prediction may be the exceptional selection in case of a connectivity interruption for longer periods, e.g. several days.

Optionally, the short-term prediction may be based on applying a recursive filter like a Kalman filter on the input flow information from all input lines. The recursive filter may enable a linear extrapolation for relatively short time periods lapsed since the latest successful receiving of input flow information from all input lines.

Optionally, the long-term prediction may be based on applying a Fourier transformation on the input flow information from all input lines and recursively updating a truncated Fourier Series for approximating an expected periodic long-term behaviour. As the flow demand profile can be expected to repeat periodically over several days with a period of one day, the truncated Fourier Series may give a rough approximation of this periodic long-term behaviour.

According to a second aspect of the present disclosure and analogous to the control system described above, a method is provided for controlling a water supply from at least two separate input lines into a sector of a water supply network, the method comprising the steps of:

receiving continuously, regularly or sporadically input flow information indicative of the water input flow through each of the input lines, receiving continuously, regularly or sporadically input pressure information indicative of the input pressure in at least a first one of the input lines, receiving continuously, regularly or sporadically sector pressure information indicative of at least one pressure value determined by at least one pressure sensor within the sector of the water supply network, controlling the input pressure by controlling at least a first pressure regulating system at the first input line based on the input flow information from all input lines and based on the sector pressure information.

Optionally, the method may further comprise the step of decreasing gradually and/or in steps the input pressure until the lowest of the at least one pressure value determined by the at least one pressure sensor within the sector has dropped to a required minimum sector pressure.

Optionally, the method may further comprise the step of controlling the contribution of the input flow through each of the input lines to the total input flow of all input lines according to an associated weight factor w for each of the input lines to obtain a desired mix of input flows.

Optionally, the method may further comprise the steps of:

receiving continuously, regularly or sporadically input pressure information indicative of the input pressure in each of the input lines, and controlling the input pressure in each of the input lines by controlling a pressure regulating system in each input line based on the input flow information and the input pressure information from all input lines, and the sector pressure information.

Optionally, the method may further comprise the step of locally controlling the first pressure regulating system, wherein the input flow information from all input lines and a parameter set [A, B] is received and the input pressure at the first input line is set to $p_{set}=Aw^2Q^2+B$, wherein Q is the total input flow of all input lines and w is a weight factor for the flow contribution of the first input line to the total input flow of all input lines.

Optionally, the method may further comprise the step of locally controlling an associated pressure regulating system i at each of the input lines, wherein the input flow information from all input lines and a parameter set $[A_i, B_i]$ is received and the input pressure at the i-th input line is set to $p_{set,i}=A_i w_i^2 Q^2 + B_i$, wherein Q is the total input flow of all input lines and $w_i$ is a weight factor for the flow contribution of the i-th input line to the total input flow of all input lines.

Optionally, the method may further comprise the steps of:

remotely updating and providing a parameter set $[A_i, B_i]$ and setting the input pressure at the i-th of the input lines to $p_{set,i}=A_i w_i^2 Q^2 + B_i$, wherein Q is the total input flow of all input lines and $w_i$ is a weight factor for the flow contribution of the i-th input line to the total input flow of all input lines.

Optionally, the input flow information from each of the input lines may comprise input flows through each of the input lines and an expected trend in the total flow of all input lines, preferably in form of a Kalman filter state vector.

Optionally, the step of controlling the input pressure by controlling at least a first pressure regulating system at the first input line may comprise selecting either a short-term prediction or a long-term prediction of the input flow information from all input lines, wherein a criterion for selecting either the short-term prediction or the long-term prediction is the time period lapsed since the latest successful receiving of input flow information from all input lines.

Optionally, the short-term prediction may be based on applying a recursive filter like a Kalman filter on the input flow information from all input lines.

Optionally, the long-term prediction may be based on applying a Fourier transformation on the input flow information from all input lines and recursively updating a truncated Fourier Series for approximating an expected periodic long-term behaviour.

According to a third aspect of the present disclosure a water supply system is provided for supplying water from at least two separate input lines into a sector of a water supply network, the water supply system comprising a control system as described above and/or being configured to be controlled according to a method as described above, wherein the water supply system further comprises a pressure regulating system at each of the input lines, wherein each pressure regulating system is configured to provide continuously, regularly or sporadically input flow information indicative of the water input flow through the associated input line, and wherein at least one of the pressure regulating systems is configured to provide continuously, regularly or sporadically input pressure information indicative of the pressure at the associated input line.

Optionally, at least one of the pressure regulating systems comprises a pump station and/or a pressure regulating valve.

Optionally, at least one of the pressure regulating systems comprises a pressure sensor.

The control system and method described above may be implemented in a form of a compiled or uncompiled software code that is stored on at least one computer readable medium with instructions for executing the method on at least one computer or one or more processors including one or more processors as a part of at least one pressure regulating system and one or more cloud-based system processors. Alternatively, or in addition, the method may be executed by software in a cloud-based system, in particular the control system may be implemented in a cloud-based system comprising one or more processors. The control system may be implemented with one or more computers and/or circuitry comprising one or more processors and memory. The one or more processors and data storage (memory) may be at the location of the pressure regulating system(s) or may be a part of a cloud-based system or may comprise processors at the location of the pressure regulating system and that are a part of a cloud-based system with communication between features at the pressure regulating system and at the cloud-based system.

Embodiments of the present disclosure will now be described by way of example with reference to the figures. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DETAILED DESCRIPTION OF PREFERRED EMBODIMENTS

Figure 1:
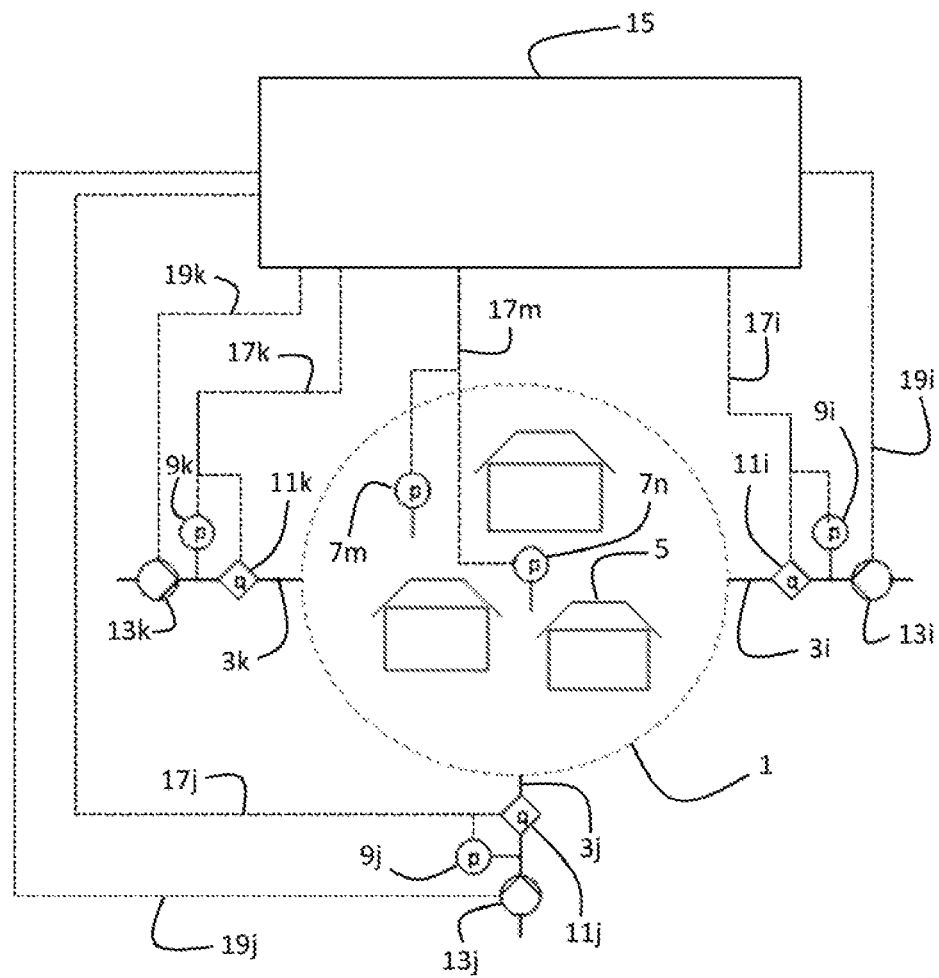
FIG. 1 is a schematic view showing an example of a water supply system with a control system according to the present disclosure, wherein the pressure regulating systems at the input lines comprise one or more pumps.

FIG. 1 shows a sector 1 of a water supply system with three input lines $3i$-$k$. The sector 1 may be an agglomeration of consumers 5, e.g. a quarter of a town. There are sector pressure sensors $7m,n$ located within the sector 1 for providing sector pressure information. The sector pressure sensors $7m,n$ are positioned at critical points within the sector 1 where a local and/or global minimum of pressure is expected. Such critical points may be points of high elevation or large distance from the input lines $3i$-$k$. The sector pressure sensors $7m,n$ may be referred to as "critical pressure sensors", because they may indicate if the pressure in the sector 1 is too low. Anywhere else in the sector 1, the pressure should be higher than at the sector pressure sensors $7m,n$.

Figure 2:
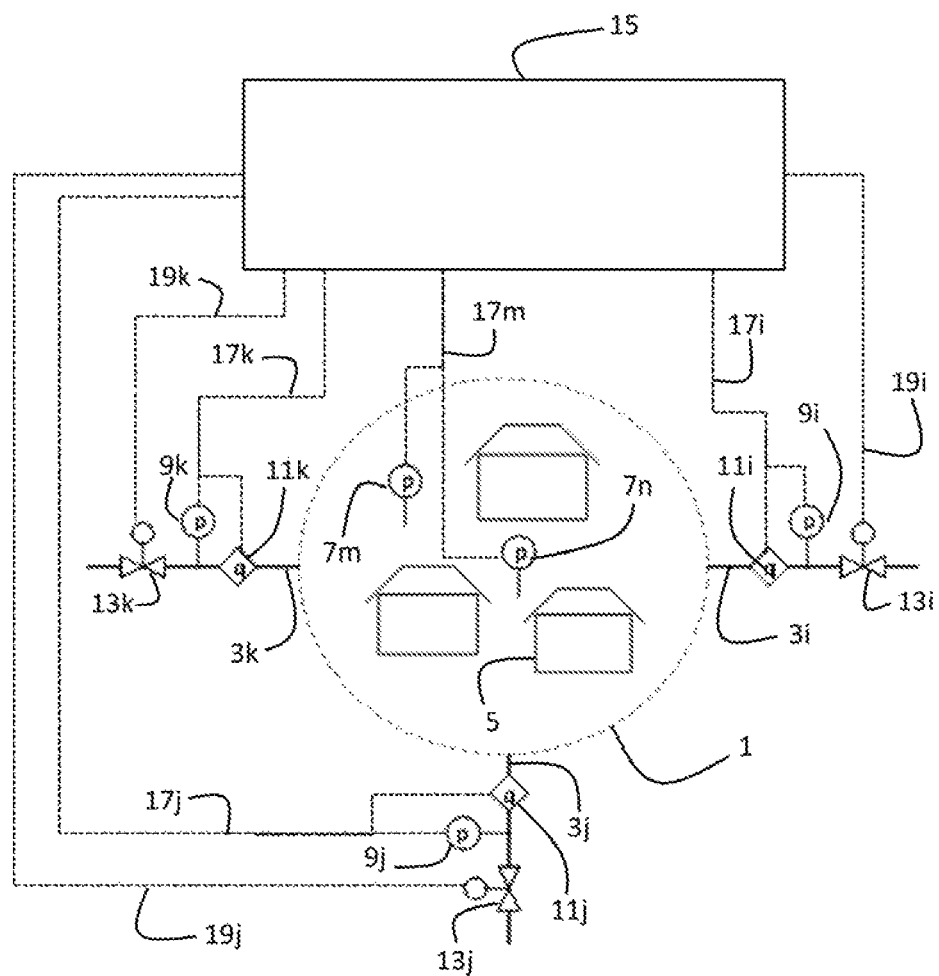
FIG. 2 is a schematic view showing an example of a water supply system with a control system according to the present disclosure, wherein the pressure regulating systems at the input lines comprise one or more pressure reduction valves (PRV)

At each of the three input lines $3i$-$k$, there is an input pressure sensor $9i$-$k$ and an input flow meter $11i$-$k$ provided downstream of a pressure regulating system $13i$-$k$. In FIG. 1, the pressure regulating systems $13i$-$k$ are pump stations or pumps. In FIG. 2, the pressure regulating systems $13i$-$k$ are PRV stations or PRVs. As the input flow meters $11i$-$k$ are quite expensive, it may be beneficial to do without flow meters $11i$-$k$ and retrieve flow information from a flow indicator given by the pump(s), for instance, power consumed or current drawn by the pump(s) in a pump-based pressure regulating system, or by the PRV(s), for instance, Δp or opening degree of the PRV(s) in a valve-based pressure regulating system. A control system 15 is configured to receive input flow information indicative of the water input flow through each of the input lines, input pressure information indicative of the input pressure in the associated input lines, and sector pressure information indicative of the pressure values determined by the sector pressure sensors 7m,n. The control system 15 may be one or more processors and memory locally installed at one or more of the pressure regulating system 13i-k and/or on a remote computer system or a cloud-based system. The control system 15 may be signal connected wirelessly or by wires with the sector pressure sensors 7m,n, the input pressure sensors 9i,j, and the flow meters 11i-k. The control system 15 receives the flow and pressure information via signal connections 17i-k,m. The control system 15 is further signal connected wirelessly or by wires with the pressure regulating systems 13i-k via signal connections 19i-k to control the input flow through the associated input line and/or input pressure at the associated input line. The signal connections 17 i-k,m, 19i-k may be part of a data network. The pressure regulating systems 13i-k in form pumps (FIG. 1) may be speed-controlled. The pressure regulating systems 13i-k, in the form of PRVs (FIG. 2), may be controlled in terms of valve opening degree. Optionally, the pressure regulating systems could be a combination of pump(s) and PRV(s). Optionally, the pressure regulating system of one input line could comprise pump(s) and another input line could comprise PRV(s).

Figure 3:
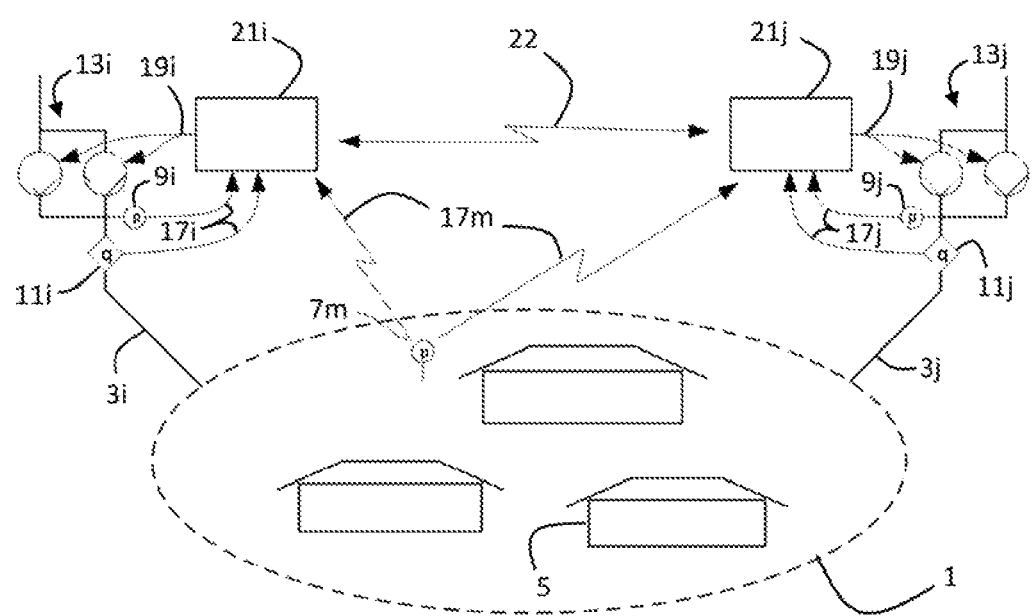
FIG. 3 is a schematic view showing an example of a water supply system with a first embodiment of the control system according to the present disclosure.
Figure 4:
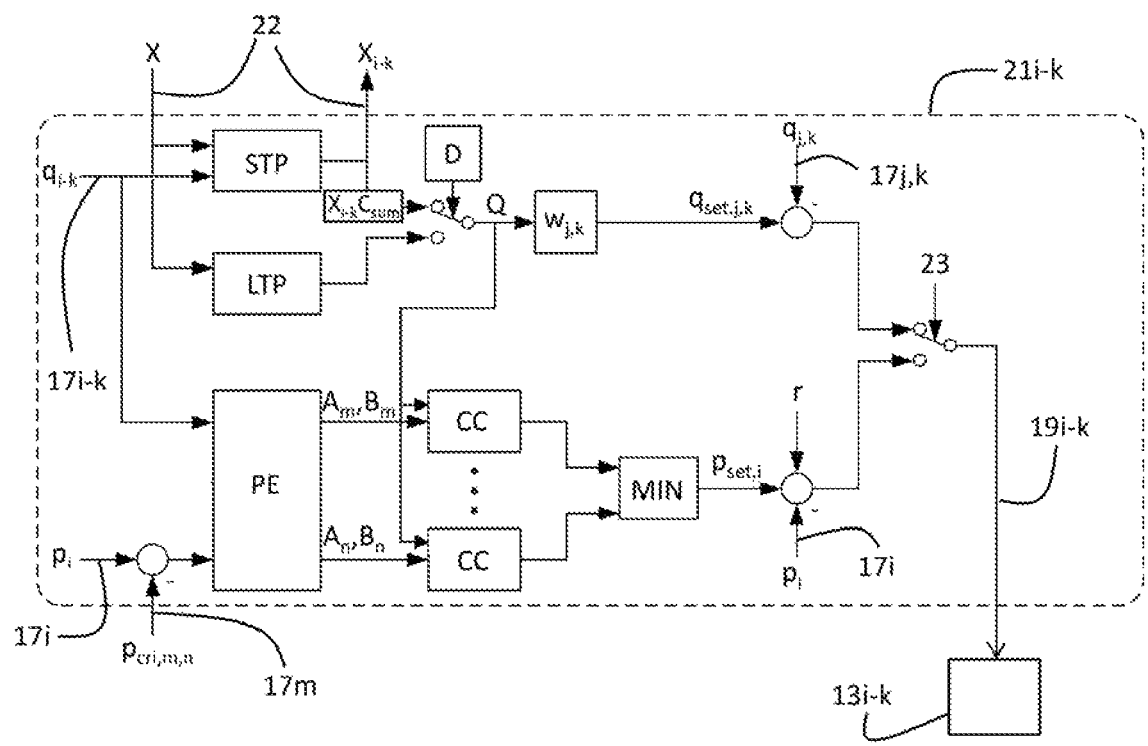
FIG. 4 is a schematic view showing an example of a control logic of a first embodiment of the control system according to the present disclosure.
Figure 5:
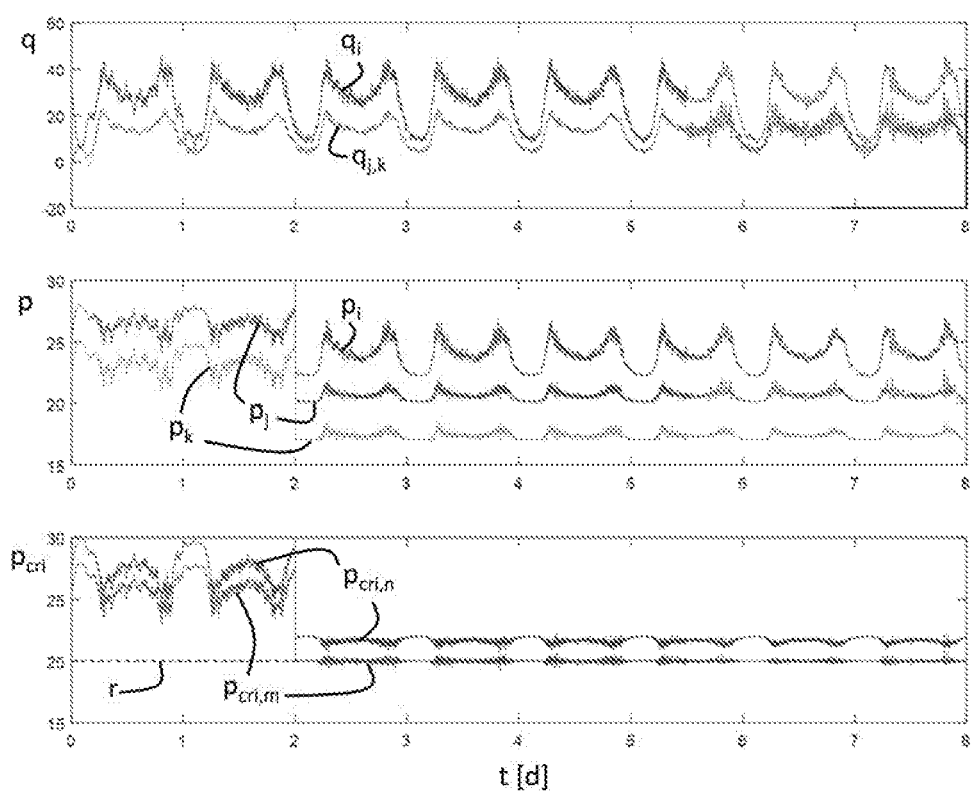
FIG. 5 is a view showing diagrams of input flows, input pressures and sector pressures over time in a water supply system with a first embodiment of the control system according to the present disclosure.

FIGS. 3 to 5 refer to a first embodiment of the control system 15 that is configured to apply a pressure-flow control logic. According to this pressure-flow control logic, a first input line 3i of the input lines 3i-k is pressure controlled, whereas the other input lines 3j,k are flow controlled (only 3j is shown in FIG. 4 for simplicity). It is beneficial in view of control stability, but not essential, that the first input line 3i is the input line that is designated to contribute the highest input flow into the sector 1. The pressure-flow control logic does not require an overarching sector control module, so that the control system 15 may be comprised of local input control modules 21i-k at the associated input lines 3i-k. The local input control modules 21i-k may be installed as identical hardware (comprised of one or more processors and memory) and/or software and may be switched to either pressure control mode or flow control mode. The first input control module 21i at the first input line 3i is switched to pressure control mode, whereas the other input control modules 21j,k are switched to flow control mode. The input control modules 21i-k communicate with each other directly via a wireless or wired communication line 22 in order to exchange input flow information. The input flow information is here exchanged in form of a Kalman filter state vector comprising input flows through each of the input lines 3i-k and an expected trend in the total flow of all input lines. The Kalman filter state vector X for three input lines may for instance be updated in each local input control modules as follows:

$$X(t+\delta t) = \begin{bmatrix} q_i \\ q_j \\ q_k \\ \delta Q \end{bmatrix}_{t+\delta t} = \begin{bmatrix} 1 & 0 & 0 & \delta t \cdot w_i \\ 0 & 1 & 0 & \delta t \cdot w_j \\ 0 & 0 & 1 & \delta t \cdot w_k \\ 0 & 0 & 0 & 1 \end{bmatrix} \cdot \begin{bmatrix} q_i \\ q_j \\ q_k \\ \delta Q \end{bmatrix}_t$$

The Kalman filter state vector X is thus recursively updated every δt. The individual input flows are denoted by $q_{i-k}$ and δQ denotes the change of the total input flow of all three input lines. The contribution of the input flow through each of the input lines to the total input flow Q is thereby controlled according to an associated weight factor $w_{i-k}$ for each of the input lines to obtain a desired mix of input flows.

The total flow Q can be extracted from the Kalman filter state vector X by multiplying an output sum matrix $C_{sum}$, e.g. $C_{sum}$=[1 1 1 0]. The recursively filtered version of the individual pump flows may be extracted from the Kalman filter state vector X by using an output matrix $C_i$, i.e. $C_i$=[1 0 0 0], $C_j$=[0 1 0 0], and $C_k$=[0 0 1 0], by applying the equations $q_i=C_iX$, $q_j=C_jX$ and $q_k=C_kX$.

The Kalman filter state vector X provides for a linear short-term prediction to bridge the time period lapsed since the latest successful receiving of input flow information from the other input lines. If said time period is long, e.g. several days due to a network breakdown, the first input control module 21i is configured to control the input pressure by controlling the first pressure regulating system 13i at the first input line 3i based on a long-term prediction. The long-term prediction may be based on applying a Fourier transformation on the input flow information from all input lines and recursively updating a truncated Fourier Series for approximating an expected periodic long-term behaviour as follows:

$$Q(t)=\gamma[1]+\Sigma_{l=1}^{L}(\gamma[2l]\cos(l\omega t)+\gamma[2l+1]\sin(l\omega t)),$$

wherein γ is a Fourier Series constant being updated based on previous measurements of the total flow Q. The period T=2π/ω of the Fourier Series may be expected to be one day, because the flow demand can often be expected to repeat in a daily pattern.

FIG. 4 shows schematically how the input control modules 21i-k operate according to the first embodiment. The first input control module 21i is switched to pressure-control mode at a switch 23 (downward in FIG. 4), whereas the other input control modules 21j,k are switched to flow-control mode at the switch 23 (upward in FIG. 4). The first input control module 21i receives the input flow $q_i$ through the first input line 3i via signal connection 17i from the associated input flow meter 11i, the local input pressure $p_i$ at the first input line 3i via signal connection 17i from the associated input pressure sensor 9i and critical sector pressure measurements $p_{cri,m,n}$ via signal connection 17m from the sector pressure sensors 7m,n. The first input control module 21i also receives via direct communication line 22 the Kalman filter state vector X from the other input control modules 21j,k, updates it according to a short-term prediction (STP) and communicates the updated Kalman filter state vector $X_i$ back to the other input control modules 21j,k via direct communication line 22. The updated Kalman filter state vector $X_i$ is not used by the first input control module 21i to control the flow contribution. This is done at the other input control modules 21j,k that are switched to flow-control. The flow-control input control modules 21j,k may switch between the short-term prediction (STP) and a long-term prediction (LTP) based on an evaluation of the time D lapsed since the last successful receiving of a Kalman filter state vector X from the other input control modules 21j,k via direct communication line 22. Based on the weight factor for the associated input line 3j,k, a flow $q_{set,j,k}$ to be set is extracted from the updated Kalman filter state vector $X_{j,k}$ by the input control module 21j,k as explained above and communicated to the associated pressure regulating system 13j,k via communication line 19i-k in order to establish the flow $q_{set,j,k}$ to be set through the input line 3j,k.

In contrast to that, the first input control module 21i performs a curve-controlled update of the pressure $p_i$ at the first input line 3i. The curve-control (CC) may for instance be a quadratic pressure curve such as:

$$p_{set}=Aw^2Q^2+B+r,$$

wherein $p_{set,i}$ is the input pressure to be set at the first input line 3i, A and B are curve parameters, Q is the total flow through all input lines, $w_i$ is a weight factor for the contribution of the first input flow to the total input flow Q, and r is the minimum pressure to be ensured at the critical sector pressure sensors.

The first input control module 21i applies an algorithm for finding the parameter set [A, B] based on the deviation between the critical sector pressure measurement(s) and the required minimum sector pressure r. The deviation between the required minimum sector pressure r and the critical point measurements may be considered during the time interval [t+δt, t+hδt] with samples {t+δt, t+2δt, ..., t+hδt}, wherein h is the number of samples on the interval and δt is the sample time in the interval T. A deviation vector $\epsilon_T$ may be given by $$\epsilon_T = \begin{bmatrix} \min\{r - p_{cri,m}[t+\delta t], \ldots, r - p_{cri,n}[t+\delta t]\} \\ \min\{r - p_{cri,m}[t+2\delta t], \ldots, r - p_{cri,n}[t+2\delta t]\} \\ \vdots \\ \min\{r - p_{cri,m}[t+h\delta t], \ldots, r - p_{cri,n}[t+h\delta t]\} \end{bmatrix},$$

wherein $p_{cri,n}[t]$ is the critical sector pressure at time t at the n-th critical sector pressure sensor 7n. Please note that the required minimum sector pressure r can vary with time and might be different for the different sector pressure sensors 7m,n. The minimum function (MIN) is used to ensure that a minimum pressure r always prevails at the most critical, i.e. lowest, of all sector pressure measurements $p_{cri,m,n}$. The parameter set [A, B] are estimated in a parameter estimation (PE) in such a way that the deviation of the sector pressure $p_{cri,m}$ at the most critical of all sector pressure sensors 7m,n from the required minimum sector pressure r is gradually and/or in steps becoming zero or minimal. The pressure $p_{set,i}$ to be set is communicated to the associated pressure regulating system 13i via communication line 19i in order to establish the pressure $p_{set,i}$ to be set at the input line 3i. The desired flow mix is achieved by the other input control modules 21j,k configured to flow-control the contribution of the other input lines 3j,k according to weight factors $w_j$ and $w_k$.

FIG. 5 illustrates the result of the control method applied by the control system according to the first embodiment over eight days of operation. The upper plot shows the individual flows $q_{i-k}$, wherein the flows $q_j$ and $q_k$ are shown on top of each other. The middle plot shows the individual input pressures $p_{i-k}$ (the highest input pressure $p_i$ is outside the visible range during the first two days) and the lower plot shows two critical sector pressure measurements $p_{cri,m,n}$. The pressure-control starts after two days during which data were collected to be able to provide both short-term prediction and long-term prediction. In particular, the long-term prediction benefits from a data collection over at least two days. The desired flow mix of 50% from the first input line 3i, i.e. $w_i$=0.5, and 25% from each of the other input line 3j,k, i.e. $w_{j,k}$=0.25, is established by the local flow controllers 21j,k at the input lines 3j,k. The flow mix is essentially unaffected by the local pressure controller 21i starting after two days to control the input pressure $p_i$ at the first input line 3i in such way that the most critical, i.e. the lowest, of the critical sector pressure measurements $p_{cri,m,n}$ is at or close to the required minimum sector pressure r. As can be seen from the middle plot, the input pressures are significantly reduced once the pressure-control is started. Consequently, the sector pressures $p_{cri,m,n}$ are reduced to a required minimum sector pressure r and, most importantly, they fluctuate much less since the pressure-control of the first input line 3i was started after two days. This saves energy and reduces leakage in the water supply system. In order to test the control stability, the pressure control was switched after five and a half days to the second input control module 21 while the first input control module 21i was switched to flow control. This switch is hardly visible, which shows that the control method is stable. The fluctuations slightly increase due to fact the second input line 3j is not the largest contributor to the total flow, but the control method is still stable enough for a reliable operation. This flexibility improves the system reliability.

FIGS. 6 to 10 refer to a second embodiment of the control system 15 that is configured to apply a pressure-only control logic. It should be noted that FIG. 6 only shows two of three input lines 3i-k for simplicity. The not shown third input line 3k is analogous to the first and second input line 3i,j. According to the pressure-only control logic, all of the input lines 3i-k are pressure-controlled. The second embodiment is thus more symmetric than the first embodiment having only one pressure-controlled input line. In the second embodiment, the input control modules 21i-k do not communicate directly via communication line 22 with each other, but via a sector control module 25 that may be referred to as "global", "overarching" or "sector-wide". The sector control module 25 serves as a communication hub between the local input control modules 21i-k and performs a sector-wide optimisation by updating and providing q,p-curve parameter sets [$A_i$, $B_i$] for each input line i. The overarching sector control module 25 may be implemented in a cloud, a network-connected remote computer system or integrated in one or more of the local input control modules 21i-k.

Figure 6:
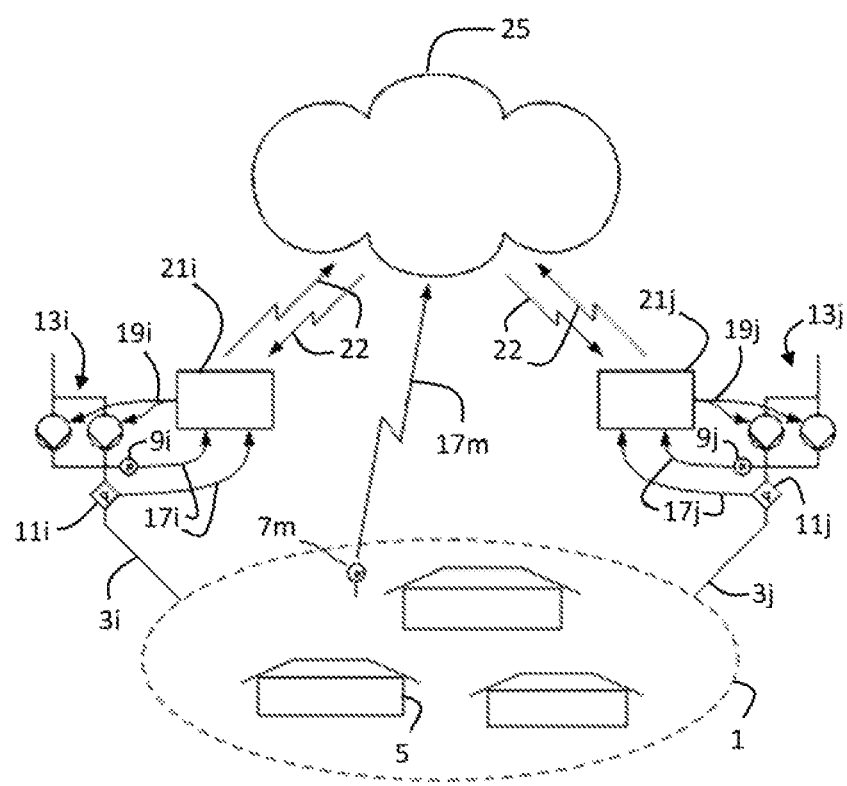
FIG. 6 is a schematic view showing an example of a water supply system with a second embodiment of the control system according to the present disclosure.

As shown in FIG. 6, the sector control module 25 receives the sector pressure information from the at least one critical sector pressure sensor 7m via signal connection 17m. The local input control modules 21i-k at the input lines 3i-k receive the input pressure information and input flow information from the local input pressure sensors 9i-k and local flow meters 11i-k, respectively, via signal connections 17i-k. Each of the local input control modules 21i-k further receives from the sector control module 25 a parameter set [$A_{i-k}$, $B_{i-k}$] for the curve-control to be applied at the associated input line 3i-k and a Kalman filter state vector with information about input flows through each of the input lines 3i-k and an expected trend in the total flow Q of all input lines 3i-k. The local input control modules 21i-k controls the associated pressure regulating system 13i-k via signal connection 19i-k to establish an input pressure $p_{set,i-k}$ to be set at input line 3i-k. The sector control module 25 optimises the parameter set [$A_{i-k}$, $B_{i-k}$] in such way that the lowest of the critical sector pressure measurements is lowered gradually and/or stepwise to reduce a deviation from the required minimum sector pressure r.

Figure 7:
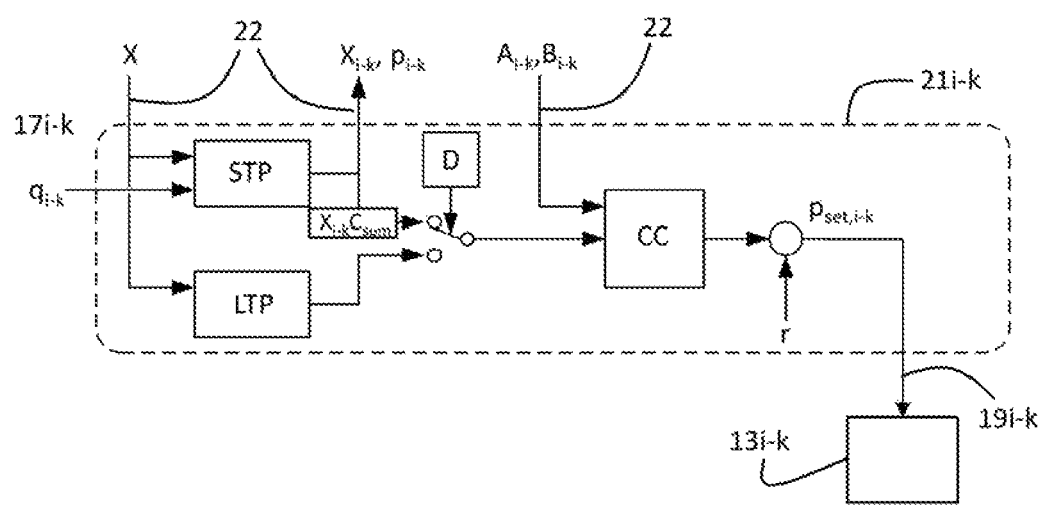
FIG. 7 is a schematic view showing an example of a control logic of a second embodiment of the control system according to the present disclosure.

As shown in FIG. 7, the local input control modules 21i-k curve-control (CC) the input pressures at the associated input line 3i-k based on the optimised parameter set [$A_{i-k}$, $B_{i-k}$] received from the sector control module 25. The curve-control may for instance be a quadratic pressure curve such as:

$$p_{set,i} = A_i w_i^2 Q^2 + B_i + r,$$

wherein $p_{set,i}$ is the pressure to be set at the i-th input line 3i, $A_i$ and $B_i$ are curve parameters, Q is the total flow through all input lines, $w_i$ is a weight factor for the contribution of the input flow through the i-th input line 3i to the total input flow Q, and r the minimum pressure to be ensured at the most critical sector pressure sensor 7*m*.

The local input control modules 21*i-k* use the received Kalman filter state vector X from all other local input control modules 21*i-k* to make 5*s* a short-term prediction (STP) or a long-term prediction (LTP), respectively, for the pressure to be set at the associated input line 3*i-k*. The choice between either applying the short-term prediction (STP) or long-term prediction (LTP) depends on whether the time period (D) lapsed since the latest successful receiving of input flow information (X) from all input lines was short or long. The local input control modules 21*i-k* may use the short-term prediction (STP) or long-term prediction (LTP) to perform the curve-control (CC) for bridging times of no communication. At one or more of the subsequent opportunities to communicate with the sector control module 25 again, the local input control modules 21*i-k* send to the sector control module 25 a Kalman filter state vector $X_{i-k}$ that is updated with respect to the associated input line 3*i-k*.

Figure 8:
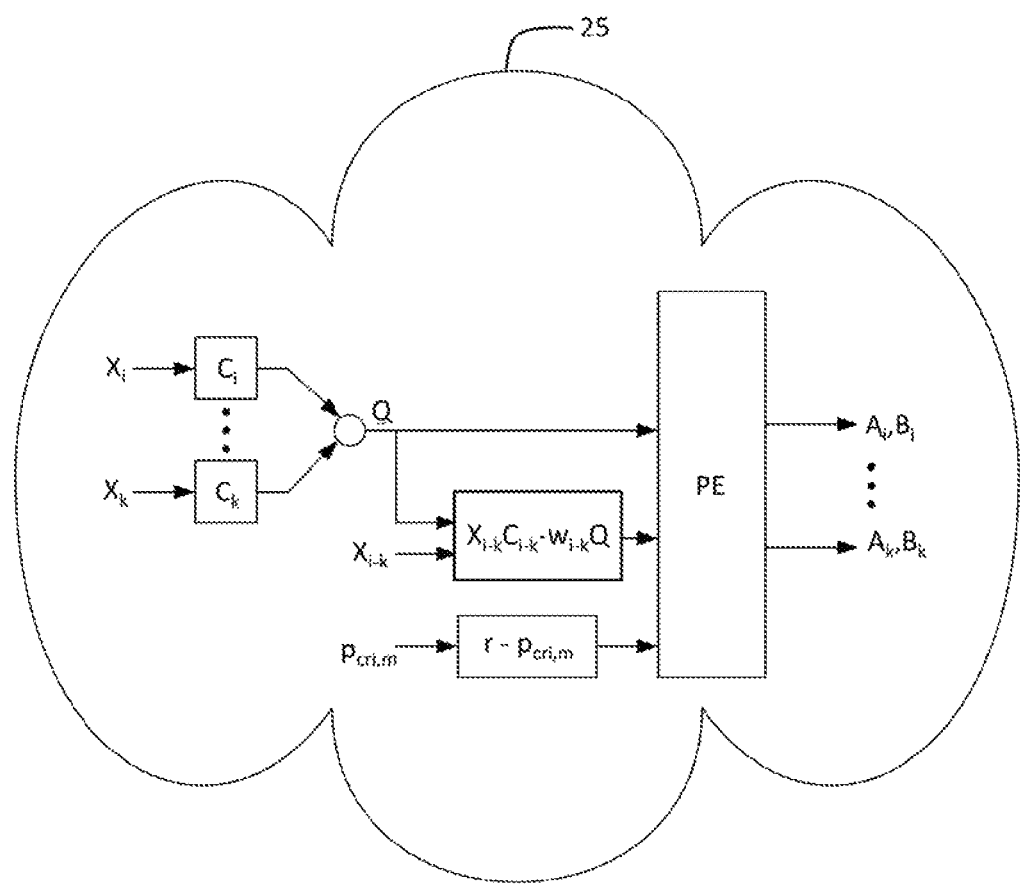
FIG. 8 is a schematic view showing an example of an optimisation logic of a second embodiment of the control system according to the present disclosure.

FIG. 8 illustrates the parameter estimation (PE) performed by the sector control module 25 in the second embodiment. The sector control module 25 applies an algorithm for finding the parameter set $[A_i, B_i]$ based on

- the deviation between the critical sector pressure measurements and the required minimum sector pressure r, and
- all received Kalman filter state vectors $X_{i-k}$ that are updated with respect to the associated input lines 3*i-k*.
- The deviation between the required minimum sector pressure r and the critical point measurements may be considered during the time interval $[t+\delta t, t+h\delta t]$ with samples $\{t+\delta t, t+2\delta t, \ldots, t+h\delta t\}$, wherein h is the number of samples on the interval and $\delta t$ is the sample time in the interval T. A deviation vector $\epsilon_T$ may be given by $$\epsilon_T = \begin{bmatrix} \min\{r - p_{cri,m}[t+\delta t], \ldots, r - p_{cri,n}[t+\delta t]\} \\ \min\{r - p_{cri,m}[t+2\delta t], \ldots, r - p_{cri,n}[t+2\delta t]\} \\ \vdots \\ \min\{r - p_{cri,m}[t+h\delta t], \ldots, r - p_{cri,n}[t+h\delta t]\} \end{bmatrix},$$

wherein $p_{cri,m}[t]$ is the critical sector pressure at time t at the m-th critical sector pressure sensor 7*m*. Please note that the required minimum sector pressure r can vary with time and might be different for the different sector pressure sensors 7*m,n*. The minimum function is used to ensure that a minimum pressure r always prevails at the most critical of all sector pressure sensors 7*m,n*.

In order to achieve both a minimum critical sector pressure and a desired flow mix, the sector control module 25 may use a parameter vector $\Theta_T$ containing the parameters $A_{i-k}$ and $B_{i-k}$ from all the individual input lines 3*i-k*

$$\Theta_T = \begin{bmatrix} A_i \\ B_i \\ \vdots \\ A_k \\ B_k \end{bmatrix},$$

where $A_i$ and $B_i$ are the parameters used for the curve control of the i-th input line 3. A data matrix $\Sigma$ may be defined by $$\Sigma(t) = \begin{bmatrix} w_i^2 Q^2(t) & 1 & \cdots & \cdots & 0 & 0 \\ \vdots & \vdots & \ddots & \ddots & \vdots & \vdots \\ 0 & 0 & \cdots & \cdots & w_k^2 Q^2(t) & 1 \end{bmatrix},$$

wherein the matrix $\Sigma$ gives the relation between the pressure to be set at the individual input lines 3*i-k* and the parameter vector $\Theta_T$, i.e. $p_{set}(t) = \Sigma(t)\Theta_T$, wherein $p_{set}(t) = [p_{set,i}(t) \ldots p_{set,k}(t)]^T$ is the pressure vector to be set at time t in the period T. The parameter vector $\Theta_T$ may be updated using the following recursive update law $$\Theta_{T+1} = \Theta_T + K(\epsilon_T \otimes M + \lambda \Sigma_{n=1}^N (g(q_{n,T}, Q_T) - w_n) \otimes U_n),$$

wherein $\otimes$ is the Kronecker product, K, M, and $U_n$ are update gain matrices, and $\lambda > 0$ is a pre-determined and/or settable balance factor for balancing the importance between the minimal critical sector pressure and the flow distribution. The vector $\Theta_T$ denotes the parameters that were used in the time interval $[t+\delta t; t+h\delta t]$, and $\Theta_{T+1}$ denotes the parameters that will be used in the coming period $[t+(h+1)\delta t; t+2h\delta t]$. The terms $w_1$ to $w_N$ are the weight factors for the required flow mix of all N input lines. The terms $\epsilon_T$, $q_{i,T}$, and $Q_T$ are vectors with measurements from the time interval $[t+\delta t; t+h\delta t]$. The function $g: R^h \times R^h \to R^h$ is a vector function given by $$g(x, y) = \begin{bmatrix} x[t+\delta t] \\ y[t+\delta t] \\ x[t+2\delta t] \\ y[t+2\delta t] \\ \vdots \\ x[t+h\delta t] \\ y[t+h\delta t] \end{bmatrix}.$$

In the case of a quadratic p,q-curve as described above, the gain matrix K is given by $$K = \kappa(X^T X)^{-1} X^T, \quad X = \begin{bmatrix} \Sigma[t+\delta t] \\ \vdots \\ \Sigma[t+h\delta t] \end{bmatrix},$$

wherein, $\kappa$ is an update gain factor larger that zero. A good choice for $M \in R^n$ may be $$M = \begin{bmatrix} 1 \\ \vdots \\ 1 \end{bmatrix}.$$

For $U_i \in R^n$, a good choice may be $$U_i = \begin{bmatrix} -\frac{1}{N-1} \\ \vdots \\ 1 \\ -\frac{1}{N-1} \\ \vdots \\ 1 \\ -\frac{1}{N-1} \end{bmatrix},$$

wherein the i-th element is 1, whereas the remaining elements equal $$-\frac{1}{N-1}.$$

Figure 9:
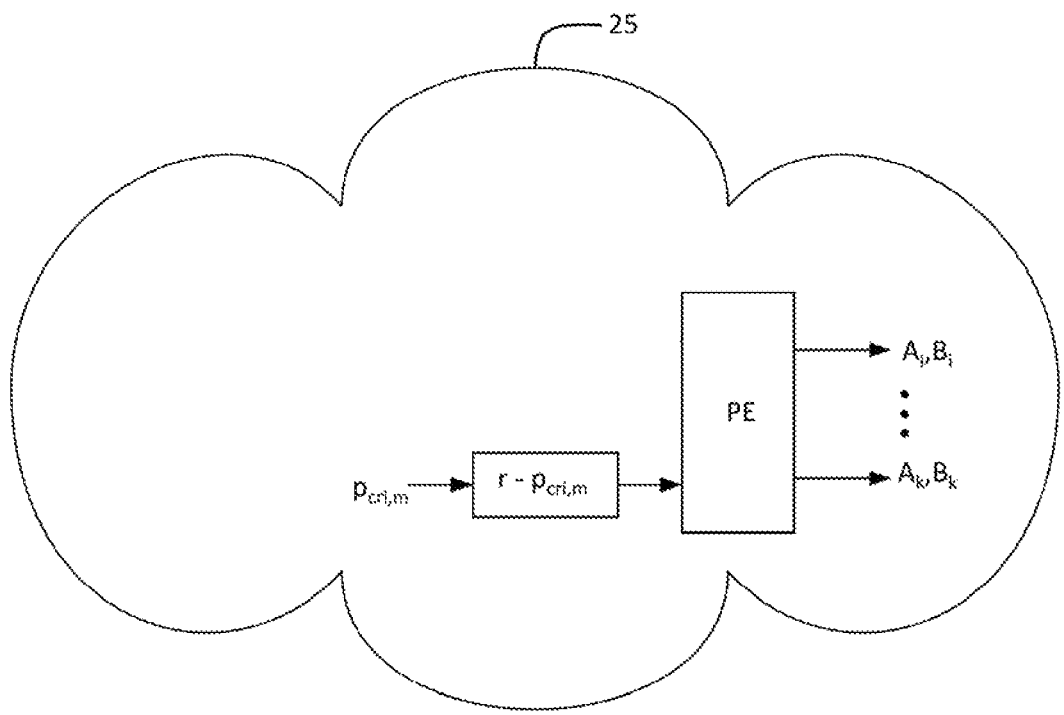
FIG. 9 is a schematic view showing an example of a simplified optimisation logic of a second embodiment of the control system according to the present disclosure.

FIG. 9 shows a simplified version of the optimisation algorithm applied by the sector control module 25 if the flow mix is considered irrelevant so that the update of the parameter sets [$A_i$, $B_i$] is only based on the deviation between the critical sector pressure measurements and the required minimum sector pressure r.

Figure 10:
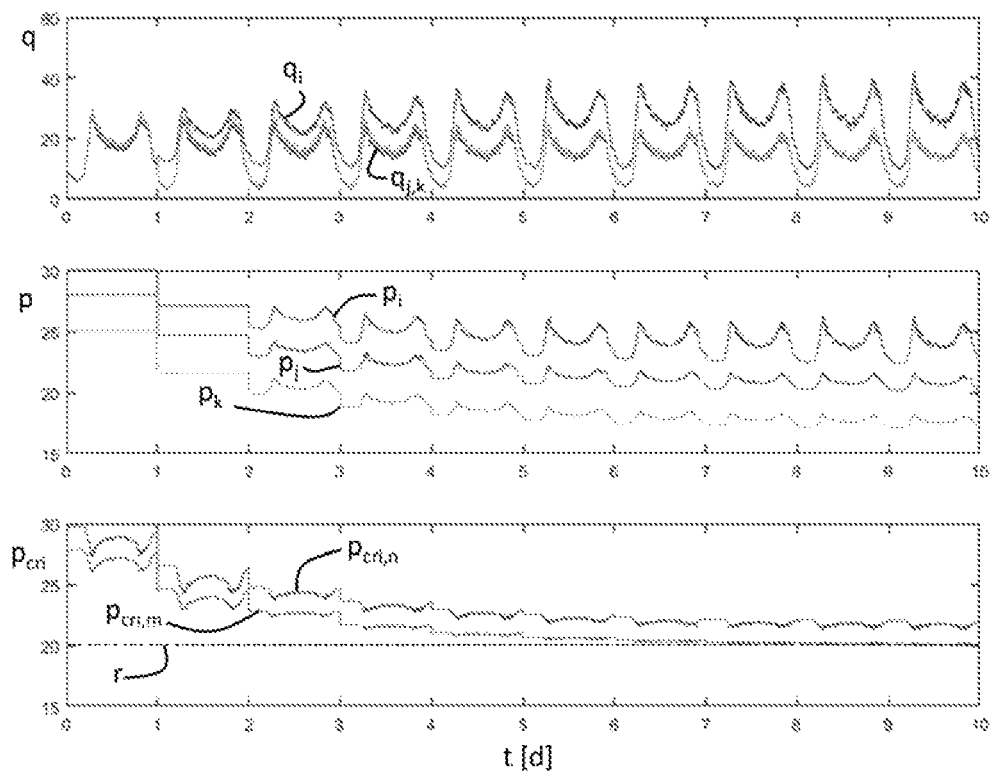
FIG. 10 is a view showing diagrams of input flows, input pressures and sector pressures over time in a water supply system with a second embodiment of the control system according to the present disclosure.

FIG. 10 illustrates the result of the pressure-only control method applied by the control system according to the second embodiment over ten days of operation. Analogous to FIG. 5, the upper plot shows the individual flows $q_{i-k}$, wherein the flows $q_i$ and $q_k$ are so similar that they lie on top of each other. The middle plot shows the individual input pressures p-k and the lower plot shows two critical sector pressure measurements. The pressure-control starts after two days during which data were collected to be able to provide both short-term prediction and long-term prediction. In particular, the long-term prediction benefits from a data collection over at least two days.

During the first day, the flows $q_i$, $q_j$ and $q_k$ are about the same, the input pressures $p_i$, $p_j$ and $p_k$ are each controlled to be constant. This results in a fluctuation of the sector pressures $p_{cri,m,n}$ measured at the critical sector pressure sensors 7m,n due to changes in demand for water supply over the day. The input pressures $p_i$, $p_j$ and $p_k$ are chosen so high in a conservative fashion to ensure that the pressure at the critical sector pressure sensors 7m,n is always above the required minimum sector pressure r.

Energy is wasted for providing the high input pressures and leakage is relatively high due to the high input pressures. The first day thus shows the undesirable situation before the water supply control method described herein is applied.

In the example shown in FIG. 10, there is a desired flow mix of 50% from the first input line 3i, i.e. $w_i$=0.5, and 25% from each of the other input line 3j,k, i.e. $w_{j,k}$=0.25. During the second day, the flow $q_i$ through the first input line 3i is slightly increased compared to the flows $q_{j,k}$ through the other input lines 3j,k. All input pressures $p_i$, $p_j$ and $p_k$ are reduced compared to the first day, but still constant over the day. Therefore, the fluctuations of the sector pressures $p_{cri,m,n}$ measured at the critical sector pressure sensors 7m,n still occur due to changes in demand for water supply over the day. Energy is wasted for providing too high input pressures and leakage is relatively high due to the high input pressures. The second day still shows the undesirable situation before the water supply control method described herein is actually applied.

As can be seen from the middle plot of FIG. 10, the water supply control method described herein is actually started after two days. The input pressures $p_i$, $p_j$ and $p_k$ are not constant anymore, but controlled to reduce the fluctuations of the most critical, i.e. lowest, of the sector pressure measurements $p_{cri,m,n}$. In fact, both sector pressure measurements $p_{cri,m,n}$ are effectively flattened, because they are highly correlated. It would in principle be possible to reduce the input pressures $p_i$, $p_j$ and $p_k$ in one step to a level such that the lowest sector pressure measurements $p_{cri,m}$ is at the required minimum sector pressure r right away. However, in order to minimise the effect on the consumer experience, the input pressures $p_i$, $p_j$ and $p_k$ are reduced in steps and/or gradually over ten days. Likewise, the desired flow mix is gradually and/or in steps approached over the ten days. As can be seen, an optimised water supply is reached after ten days. The most critical, i.e. lowest, of the sector pressure measurements $p_{cri,m}$ is constant and at the required minimum sector pressure r to ensuring an minimal pressure within the sector at all times. The desired flow mix is also established. The input pressures $p_i$, $p_j$ and $p_k$ are optimised to their minimum in order to save energy and reduce leakage.

Where, in the foregoing description, integers or elements are mentioned which have known, obvious or foreseeable equivalents, then such equivalents are herein incorporated as if individually set forth. Reference should be made to the claims for determining the true scope of the present disclosure, which should be construed so as to encompass any such equivalents. It will also be appreciated by the reader that integers or features of the disclosure that are described as optional, preferable, advantageous, convenient or the like are optional and do not limit the scope of the independent claims.

The above embodiments are to be understood as illustrative examples of the disclosure. It is to be understood that any feature described in relation to any one embodiment may be used alone, or in combination with other features described, and may also be used in combination with one or more features of any other of the embodiments, or any combination of any other of the embodiments. While at least one exemplary embodiment has been shown and described, it should be understood that other modifications, substitutions and alternatives are apparent to one of ordinary skill in the art and may be changed without departing from the scope of the subject matter described herein, and this application is intended to cover any adaptations or variations of the specific embodiments discussed herein.

In addition, "comprising" does not exclude other elements or steps, and "a" or "one" does not exclude a plural number. Furthermore, characteristics or steps which have been described with reference to one of the above exemplary embodiments may also be used in combination with other characteristics or steps of other exemplary embodiments described above. Method steps may be applied in any order or in parallel or may constitute a part or a more detailed version of another method step.

It should be understood that there should be embodied within the scope of the patent warranted hereon all such modifications as reasonably and properly come within the scope of the contribution to the art. Such modifications, substitutions and alternatives can be made without departing from the spirit and scope of the disclosure, which should be determined from the appended claims and their legal equivalents.

While specific embodiments of the invention have been shown and described in detail to illustrate the application of the principles of the invention, it will be understood that the invention may be embodied otherwise without departing from such principles.

LIST OF REFERENCE NUMERALS 1 sector of a water supply system
3i-k input lines
5 consumer
7m,n sector pressure sensors
9i-k input pressure sensors
11i-k input flow meters
13i-k pressure regulating systems
15 control system
17i-k,m signal connections
19i-k signal connections
21i-k input control modules 22 communication line
23 switch
25 sector control module
r required minimum sector pressure
$p_i$ input pressure at input line i
$q_i$ input flow through input line i
Q total input flow through all input lines
$w_i$ weight factor for the flow contribution of input line I to the total flow Q

What is claimed is:

1. A control system for controlling a water supply from at least two separate water input lines into a sector of a water supply network, wherein the control system is configured to:
  receive input flow information indicative of water input flow through each of the input lines;
  receive input pressure information indicative of input pressure in at least a first input line of the at least two separate water input lines;
  receive sector pressure information indicative of at least one pressure value determined by at least one pressure sensor within the sector of the water supply network; and
  generate at least one control output to control the input pressure by controlling at least a first pressure regulating system at the first input line based on the received input flow information from each of the input lines and based on the received sector pressure information.

2. The control system according to claim 1, wherein the control system is configured to decrease the input pressure until a lowest pressure value of the at least one pressure value determined by the at least one pressure sensor within the sector has dropped to a required minimum sector pressure.

3. The control system according to claim 1, wherein the control system is configured to generate at least one control output to control a contribution of the input flow through each of the input lines to the total input flow of all input lines according to an associated weight factor for each of the input lines to obtain a desired mix of input flows.

4. The control system according to claim 1, wherein the control system is configured to:
  receive input pressure information indicative of the input pressure at each of the input lines;
  generate at least one control output to control a pressure regulating system in each input line to control the input pressure in each of the input lines based on the input flow information from all input lines, the input pressure information from all input lines, and the sector pressure information.

5. The control system according to claim 1, wherein:
  the control system comprises a first input control module for controlling the first pressure regulating system, wherein the first input control module is configured to receive the input flow information from all input lines and to receive a parameter set [A, B] and to generate the at least one control output for setting the input pressure at the first input line to $p_{set}=Aw^2Q^2+B$;
  Q is the total input flow of all input lines; and
  w is a weight factor for the flow contribution of the first input line to the total input flow of all input lines.

6. The control system according to claim 1, wherein:
  the control system comprises a plurality of input control modules, wherein each of the plurality of input control modules is for a corresponding one of the input lines for controlling an associated pressure regulating system at each of the input lines;
  each input control module is configured to receive the input flow information from all input lines and to receive a parameter set $[A_i, B_i]$ for setting the input pressure at a corresponding one (i-th) of the input lines to $p_{set,i}=A_iw_i^2Q^2+B_i$;
  Q is the total input flow of all input lines; and
  $w_i$ is a weight factor for the flow contribution of the i-th of the input lines to the total input flow of all input lines.

7. The control system according to claim 1, wherein:
  the control system comprises a sector control module for receiving the input flow information from individual ones (i-th) of the input lines and the sector pressure information;
  the sector control module is further configured to update and provide a parameter set $[A_i, B_i]$ for the input pressure at each of the input lines to be set to $p_{set,i}=A_iw_i^2Q^2+B_i$;
  Q is the total input flow of all input lines; and
  $w_i$ is a weight factor for the flow contribution of the i-th of the input lines to the total input flow of all input lines.

8. The control system according to claim 1, wherein the input flow information from each of the input lines comprises input flows through each of the input lines and an expected trend in the total flow of all input lines, in a form of a Kalman filter state vector.

9. The control system according to claim 1, wherein:
  the control system generates the at least one control output to control at least a first pressure regulating system at the first input line based selectively on a short-term prediction or a long-term prediction of the input flow information from all input lines;
  a criterion for selecting either the short-term prediction or the long-term prediction is a time period that has lapsed since a latest successful receiving of input flow information from all input lines.

10. The control system according to claim 9, wherein the short-term prediction is based on applying a recursive filter on the input flow information from all input lines.

11. The control system according to claim 9, wherein the long-term prediction is based on applying a Fourier transformation on the input flow information from all input lines and recursively updating a truncated Fourier Series for approximating an expected periodic long-term behavior.

12. A method for controlling a water supply, from at least two separate input lines, into a sector of a water supply network, the method comprising the steps of:
  receiving input flow information indicative of the water input flow through each of the input lines;
  receiving input pressure information indicative of the input pressure in at least a first one of the input lines;
  receiving sector pressure information, indicative of at least one pressure value determined by at least one pressure sensor within the sector of the water supply network; and
  controlling the input pressure by controlling at least a first pressure regulating system at the first input line, based on the input flow information from all input lines and based on the sector pressure information.

13. The method according to claim 12, further comprising the step of decreasing the input pressure until a lowest of the at least one pressure value determined by the at least one pressure sensor within the sector has dropped to a required minimum sector pressure.

14. The method according to claim 12, further comprising the step of controlling a contribution of the input flow through each of the input lines to the total input flow of all input lines according to an associated weight factor for each of the input lines to obtain a desired mix of input flows.

15. The method according to claim 12, further comprising the steps of:
receiving input pressure information indicative of the input pressure in all other input lines; and
controlling the input pressure in each of the input lines by controlling all other pressure regulating systems at all other input lines based on the input flow information from all input lines, the input pressure information from all input lines, and the sector pressure information.

16. The method according to claim 12, further comprising the step of locally controlling the first pressure regulating system, wherein:
the input flow information from all input lines and a parameter set [A, B] is received and the input pressure at the first input line is set to $p_{set}=Aw^2Q^2+B$;
Q is the total input flow of all input lines; and
w is a weight factor for the flow contribution of the first input line to the total input flow of all input lines.

17. The method according to claim 12, further comprising the step of locally controlling an associated pressure regulating system at each of the input lines, wherein:
the input flow information from all input lines and a parameter set [$A_i$, $B_i$] is received and the input pressure at each (i-th) of the input lines is set to $p_{set,i}=A_iw_i^2Q^2+B_i$;
Q is the total input flow of all input lines; and
$w_i$ is a weight factor for the flow contribution of the i-th of the input lines to the total input flow of all input lines.

18. The method according to claim 12, further comprising the steps of:
remotely updating and providing a parameter set [$A_i$, $B_i$]; and
setting the input pressure at each (i-th) of the input lines to $p_{set,i}=A_iw_i^2Q^2+B_i$;
Q is the total input flow of all input lines; and
$w_i$ is a weight factor for the flow contribution of the i-th of the input lines to the total input flow of all input lines.

19. The method according to claim 12, wherein the input flow information from each of the input lines comprises input flows through each of the input lines and an expected trend in the total flow of all input lines in a form of a Kalman filter state vector.

20. The method according to claim 12, wherein:
the step of controlling the input pressure by controlling at least a first pressure regulating system at the first input line comprises selecting either a short-term prediction or a long-term prediction of the input flow information from all input lines; and
a criterion for selecting either the short-term prediction or the long-term prediction is a time period that has lapsed since a latest successful receiving of input flow information from all input lines.

21. The method according to claim 20, wherein the short-term prediction is based on applying a recursive filter on the input flow information from all input lines.

22. The method according to claim 20, wherein the long-term prediction is based on applying a Fourier transformation on the input flow information from all input lines and recursively updating a truncated Fourier Series for approximating an expected periodic long-term behavior.

23. A water supply system for supplying water from at least two separate input lines into a sector of a water supply network, the water supply system comprising:
a pressure regulating system at each of the at least two separate input lines, wherein each pressure regulating system is configured to provide input flow information indicative of the input flow through an associated input line of the at least two separate input lines and at least one of the pressure regulating systems is configured to provide input pressure information indicative of the pressure at the associated input line; and
a control system for controlling the supply of water from the at least two separate water input lines into the sector of the water supply network, wherein the control system is configured to: receive the input flow information; receive the input pressure information; receive sector pressure information indicative of at least one pressure value determined by at least one pressure sensor within the sector of the water supply network; and generate at least one control output to control the input pressure by controlling at least a first pressure regulating system at a first of the at least two input lines based on the received input flow information from all input lines and based on the received sector pressure information.

24. The water supply system according to claim 23, wherein at least one of the pressure regulating systems comprises a pump station and/or a pressure regulating valve.

25. The water supply system according to claim 23, wherein at least one of the pressure regulating systems comprises a pressure sensor.

* * * * *